United States Patent
Adkins, III et al.

(10) Patent No.: US 10,673,710 B2
(45) Date of Patent: Jun. 2, 2020

(54) SERVICE ACTIVATION SYSTEM

(71) Applicant: Level 3 Communications, LLC, Broomfield, CO (US)

(72) Inventors: James M. Adkins, III, Elizabeth, CO (US); Craig Tystad, Castle Rock, CO (US); James C. Dwyer, Spring, TX (US)

(73) Assignee: Level 3 Communications, LLC, Broomfield, CO (US)

( * ) Notice: Subject to any disclaimer, the term of this patent is extended or adjusted under 35 U.S.C. 154(b) by 555 days.

(21) Appl. No.: 15/355,666

(22) Filed: Nov. 18, 2016

(65) Prior Publication Data

US 2017/0141970 A1    May 18, 2017

Related U.S. Application Data (60) Provisional application No. 62/256,932, filed on Nov. 18, 2015.

(51) Int. Cl.
  *G06F 15/177* (2006.01)
  *H04L 12/24* (2006.01)
(52) U.S. Cl.
  CPC ...... *H04L 41/5041* (2013.01); *H04L 41/0806* (2013.01); *H04L 41/0843* (2013.01); *H04L 41/0869* (2013.01); *H04L 41/5054* (2013.01); *H04L 41/5077* (2013.01)
(58) Field of Classification Search
  CPC ............. H04L 41/5041; H04L 41/0806; H04L 41/0869; H04L 41/5054; H04L 41/5077
  USPC .................................. 709/220, 221; 370/354
  See application file for complete search history.

(56) References Cited

U.S. PATENT DOCUMENTS

| | | | |
|---|---|---|---|
| 7,117,504 B2* | 10/2006 | Smith | G06F 8/20 719/328 |
| 7,707,066 B2* | 4/2010 | Roever | G06Q 20/04 705/27.1 |
| 9,270,461 B2* | 2/2016 | Giladi | H04N 21/26258 |
| 9,967,230 B2* | 5/2018 | Akef | H04L 61/2076 |
| 10,090,069 B2* | 10/2018 | Lee | G16H 40/20 |
| 10,250,556 B2* | 4/2019 | Akef | H04L 61/2076 |
| 2004/0003400 A1* | 1/2004 | Carney | G06Q 30/02 725/42 |

(Continued)

OTHER PUBLICATIONS

International Preliminary Report on Patentability dated May 22, 2018, Int'l Appl. No. PCT/US16/062812, Int'l Filing Date Nov. 18, 2016; 8 pgs.

(Continued)

*Primary Examiner* — Thu Ha T Nguyen (57) ABSTRACT

Aspects of the present disclosure include an activation, consolidation, and transformation system (ACT) for a telecommunications network. A request is received to provision one or more devices in a network and includes a key and key value. The request is routed to a data source associated with the key or key value of the request. Data is queried from the data source and validated by the ACT. At least one template is identified from a plurality of digital templates based upon attributes of the data that is applied to the at least one template and the template transforms the data to an output. The output comprises instructions for configuring a device for a telecommunications service based on the request.

20 Claims, 8 Drawing Sheets

(56) References Cited

U.S. PATENT DOCUMENTS

| | | | |
|---|---|---|---|
| 2005/0050354 A1* | 3/2005 | Gociman | G06F 21/6218 726/4 |
| 2007/0162300 A1* | 7/2007 | Roever | G06Q 20/12 705/57 |
| 2007/0240154 A1* | 10/2007 | Gerzymisch | G06F 8/61 717/174 |
| 2008/0077680 A1* | 3/2008 | Dellarole | G06F 9/5038 709/220 |
| 2008/0120129 A1* | 5/2008 | Seubert | G06Q 10/06 705/35 |
| 2008/0171588 A1 | 7/2008 | Atashband | |
| 2009/0077371 A1* | 3/2009 | Powell | H04L 9/083 713/152 |
| 2011/0033050 A1* | 2/2011 | Maller | G06F 21/60 380/259 |
| 2011/0035581 A1* | 2/2011 | Maller | G06O 10/10 713/152 |
| 2011/0082930 A1 | 4/2011 | Tuzhilin et al. | |
| 2012/0233073 A1* | 9/2012 | Salmon | G06Q 20/381 705/44 |
| 2013/0218657 A1* | 8/2013 | Salmon | G06Q 10/00 705/14.29 |
| 2014/0223563 A1 | 8/2014 | Durie et al. | |
| 2015/0154588 A1* | 6/2015 | Purves | G06Q 30/0641 705/14.27 |
| 2015/0180894 A1* | 6/2015 | Sadovsky | G06F 3/0481 726/22 |
| 2015/0186132 A1* | 7/2015 | Oliveri | G06F 8/34 717/120 |
| 2016/0094510 A1* | 3/2016 | Xiao | G06Q 10/107 709/206 |
| 2017/0006135 A1* | 1/2017 | Siebel | H04L 67/02 |
| 2017/0078144 A1* | 3/2017 | Purusothaman | H04L 41/0813 |
| 2017/0141970 A1* | 5/2017 | Adkins, III | H04L 41/5041 |
| 2017/0230329 A1* | 8/2017 | Akef | H04L 61/2076 |
| 2017/0289060 A1* | 10/2017 | Aftab | H04L 67/1097 |
| 2017/0329955 A1* | 11/2017 | Hessler | G06F 21/44 |
| 2017/0372301 A1* | 12/2017 | Theurer | G06Q 20/36 |
| 2018/0075262 A1* | 3/2018 | Auh | G06F 21/78 |
| 2018/0132138 A1* | 5/2018 | Senarath | H04W 24/02 |
| 2018/0248843 A1* | 8/2018 | Akef | H04L 67/02 |

OTHER PUBLICATIONS

International Search Report dated Feb. 2, 2017, Int'l Appl. No. PCT/US16/062812, Int'l Filing Date Nov. 18, 2016; 3 pgs.

Written Opinion of the International Searching Authority dated Feb. 2, 2017, Int'l Appl. No. PCT/US16/062812, Int'l Filing Date Nov. 18, 2016; 6 pgs.

* cited by examiner

SERVICE ACTIVATION SYSTEM

CROSS-REFERENCE TO RELATED APPLICATION

This application is related to and claims priority under 35 U.S.C. § 119(e) from U.S. Patent Application No. 62/256,932, filed Nov. 18, 2015 entitled "SERVICE ACTIVATION SYSTEM," the entire contents of which is incorporated herein by reference for all purposes.

TECHNICAL FIELD

Aspects of the present disclosure relate to a service activation system for a network; and more particularly, to a system for improving device activation and configuration in a network by utilizing a plurality of keys to obtain information about a request for a telecommunications service from an appropriate data source, validating the information from the data source, and transforming the information into a format for configuring certain network devices to provision the telecommunications service associated with the request.

BACKGROUND

A service provider in the telecommunications industry faces unique challenges with respect to providing the required technical infrastructure to fulfill services for its customers. The service provider must process orders from clients for various possible services, where each order and each possible service may require unique configurations of numerous devices needed to fulfill the service.

However, conventional order provisioning systems often lack for the ability to validate data associated with incoming orders or manage data from multiple input sources. Specifically, when devices are being prepared to provide services to customers, it may be determined that the data associated with activating the devices is missing, inaccurate, or incomplete. When such incomplete data is encountered, many conventional systems generate errors and/or require new orders to be submitted. Further, conventional order provisioning systems may not address compatibility issues. For example, a service provider may receive orders from different types of order entry systems which may require collection of different types of data to fulfill the orders. Further still, different devices may need to be configured to provide a service which may require different types or forms of configuration information. A conventional system may often require manual intervention to configure different types of devices or otherwise access information needed for different device configurations.

It is with these observations in mind, among others, that various aspects of the present disclosure were conceived and developed.

SUMMARY

A need exists for an enhanced order processing system that assists with provisioning an ordered telecommunications service. Accordingly, one implementation of the present disclosure may take the form of a method for provisioning a network service. The method may include the operations of utilizing a processor in communication with a non-transitory memory for storing instructions that are executed by the processor to perform the operations accessing a request associated with a network connection design, the request including a key and associated key value, querying data associated with providing a telecommunications service based on the request from a data source based at least on the key value, and validating the data using a rule comparing the data to an expected data structure. Further, the method may include the operations of identifying a configuration template from a plurality of templates based upon attributes of the data and applying the data to the configuration template to transform the data to an output, the output comprising instructions to a network configuration system to configure a network device associated with the network connection design.

Another implementation of the present disclosure may take the form of a system for provisioning a network service. The system may include at least one communication port for receiving a request associated with a network connection design to provide an intended network service to a user of a telecommunications network, the request comprising a key and associated key value, a processing device, and a computer-readable medium connected to the processing device configured to store instructions that, when executed by the processing device, performs operations. Such operations may include querying data associated with the intended network service from a data source based at least on the associated key value of the request and transforming the data to an output to configure a network device to provide a telecommunications service by identifying a configuration template from a plurality of templates based upon attributes of the data applying the data to the configuration template to transform the data to the output.

Yet another implementation of the present disclosure may take the form of an apparatus comprising a first network device, a second network device, and a computing device for communicably coupling the first network device with the first network device in response to a request. The request may comprise a key and the computing device utilizes the key to access data and a template associated with the key and the computing device applies the data to the template to generate an output, the output comprising information for configuring the second network device to be coupled to the first network device to provision a telecommunications service.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Aspects of the present disclosure involve systems and methods for a service activation, consolidation, and transformation (ACT) system in a telecommunications network. The ACT system may be implemented by one or more computing devices, where the ACT system receives information associated with an order for a telecommunications service and transmits the information to one or more network resources in order to generate data needed to provision the service. The ACT system may further validate the data and generate an output, based on the data, that is used to provision the ordered telecommunication service by activating and configuring network devices. Specifically, the ACT system accesses or receives information about an order (generated from an order entry system) for a telecommunications service in the form of a request. In one example, the request is generated by a service activation orchestration system (SAO) associated with the telecommunications network. In general, the SAO may be any system that creates a network connection design defining the network devices and configurations needed to provide the telecommunications service associated with the order.

Upon generation of the request, the SAO sends the request to the ACT to begin the process of executing the request and provide services to the requesting customer of the network. In one embodiment, the request includes information needed for the network connection design to provide the requested service. For example, the request may include keys, parameters, or fields, such as network device identifiers and service identifiers. A key of the request may assist with identifying a specific system or device that stores some information needed for the network connection design. The ACT system then contacts the system or device identifiable through the keys of the request that stores the service information to retrieve the information. The service information or data is retrieved or otherwise accessed from the data gathering system as needed to configure and activate network devices for the network connection design associated with the request.

Once obtained, the data is then validated by the ACT. In one example, the ACT system verifies whether the retrieved service data is complete such that the data provides all the information needed to activate and configure the affected network devices to provide the ordered telecommunications service as defined by the request. The data may further be validated to determine whether the data is accurate. For example, the ACT system may determine that the SAO system has generated a network connection design that cannot be provided to the requesting customer for whatever reason, or that the request includes an incorrect device identifier that prevents the ACT system from configuring the appropriate device needed to provide the ordered telecommunications service.

Upon validating the data, the ACT system then transforms the data into an output that is used by a network service orchestrator to configure the network devices of the network connection design generated by the SAO (in order to provision the ordered telecommunications service). More particularly, the SAO utilizes a database comprising a plurality of digital templates. The digital templates may each be unique or configured for certain network devices and/or device types such that each template may be used to transform data (or portions of the data) to an output specifically formatted to configure a certain network device (as needed in the course of provisioning the telecommunications service). Thus, the retrieved data of the service request may be used to fill out the templates to provide instructions on configuring the network device or devices to provide the services.

To determine which of the templates is used for the requested service, each of the digital templates may comprise certain conditional statements that may be satisfied by attributes of the data. The ACT system selects a template where attributes of the data satisfy the conditional statements of the template. Once a template has been selected, the data is applied to the template to generate the output of instructions on providing the requested service or services. In one example, the output may comprise commands in a format or communication language that is unique for communicating with and applying configurations to a particular network device or device type. The output may be transmitted to or otherwise accessed by a configuration system which executes the commands and applies the configurations to network devices using the output or the ACT system. In other embodiments, the ACT system itself may apply the device configurations to provision the networking devices to provide the requested services.

In general, the ACT system may be associated with a telecommunications network and connected between the order entry system and a configuration system such that the ACT system is ideally suited to address orders or requests that may require correction before the orders or requests are sent to the configuration system (or device configurations are otherwise implemented). The ACT system reduces the likelihood that information needed to configure devices for provisioning a telecommunications service is incomplete or erroneous and facilitates and validates communications between different systems used to fulfill an order for a telecommunications service, which is advantageous when the order requires different types of information from different systems.

Figure 1:
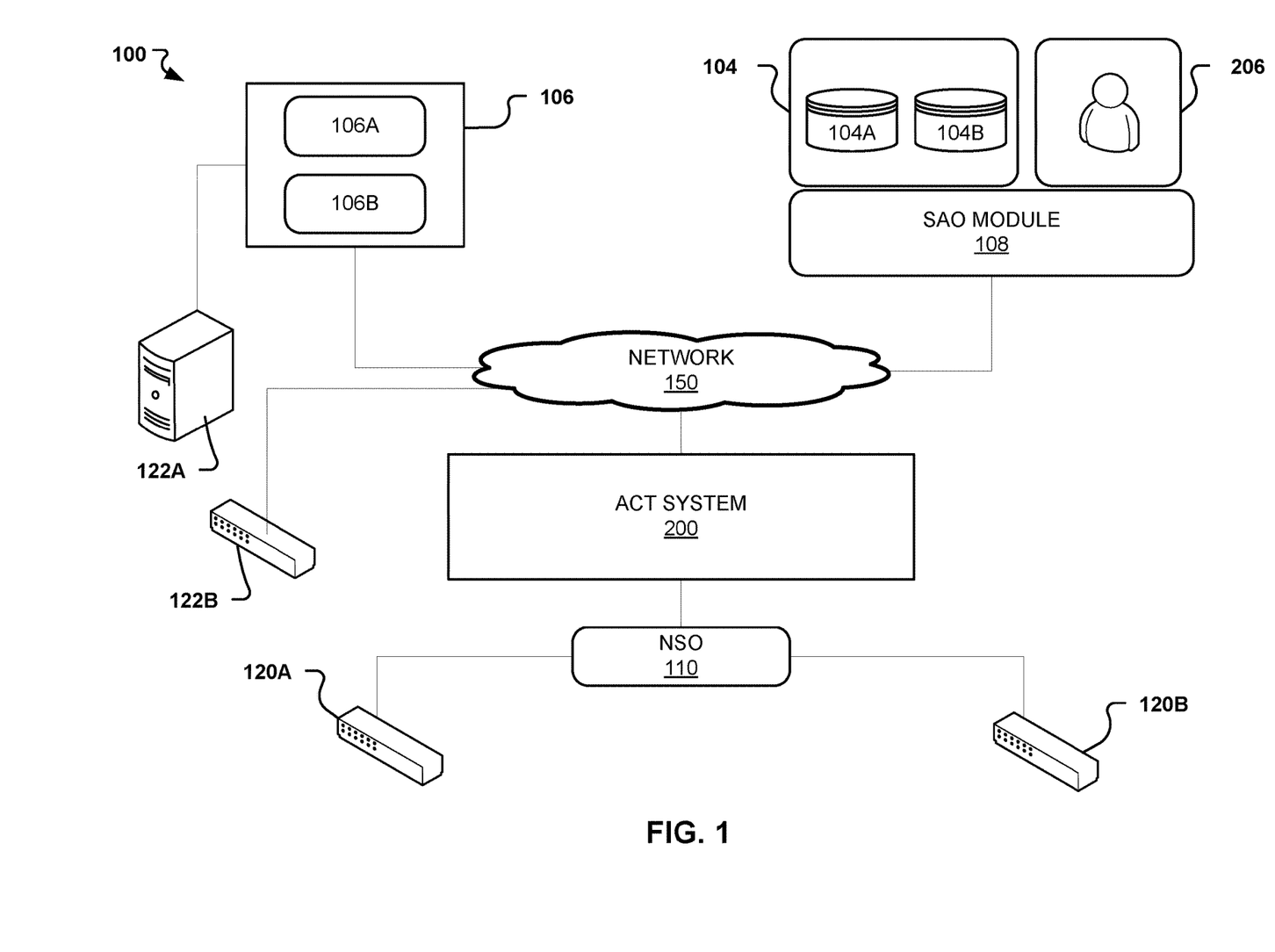
FIG. 1 illustrates an exemplary system view of an order provisioning system utilizing an activation and control (ACT) system, according to aspects of the present disclosure.

FIG. 1 illustrates a system 100 of a telecommunications service provider for fulfilling an order for a telecommunications service, in accordance with various embodiments discussed herein. The system 100 comprises a plurality of order entry systems 106 or requestor modules. The order entry systems 106A-106B may receive orders for telecommunications services from customer devices 122A or from administrators of the telecommunications network. The system 100 further comprises a Service Activation Orchestration (SAO) system 108, which may include any system, device, or program that analyzes an order for a telecommunications service from the order entry systems 106, creates a network connection design based on the order, and generates a request. In some instances, the creation of the connection design may include input from a network engineer. The request generated by the SAO may be used to produce data or instructions needed to activate and configure network devices to implement the network connection design and provision the ordered telecommunications service. The SAO system 108 may utilize network design engineers, network design automation applications, and/or combinations thereof to generate the network connection design and the request. The system 100 further includes a plurality of data sources 104A, 104B which store or otherwise have access to the data needed for the request from the SAO system 108.

The system 100 may further include a Network Service Orchestrator (NSO) system 110. In general, the NSO 110 is a configuration system that activates and configures devices as set out in the network connection design generated by the SAO system 108 or any other type of connection design. The system 100 may further include a customer computing device 122A, a customer network device 122B, and one or more networking devices 120A or 120B of the telecommunications service provider. The customer computing device 122A may be used to submit the order for the telecommunications service to the order entry systems 106. The customer computing device 122A may comprise at least one computing system and may comprise a server, desktop computer, smartphone, or other device capable of accessing the order entry systems 106 and submitting an order for a telecommunications service. The customer network device 122B may be connected to one or more of the devices 120A or 120B to provision the ordered telecommunications service. Each of the customer network device 122B or devices 120A or 120B may comprise a network interface device such as router, a switch, a session border controller (SBC), a gateway, a gateway controller, or the like.

FIG. 1 further shows an Activation, Consolidation, and Transformation (ACT) system 200 implemented using one or more computing devices which may be connected within a central portion of the system 100 or between the SAO system 108 and the NSO system 110. In general, the ACT system 200 receives a request for network services as generated by the SAO system 108 and utilizes information about the request to access network resources (such as the plurality of data sources 104) in order to generate data needed for the network connection design. The ACT system 200 further validates the retrieved data and generates an output based on the data that is provided to the NSO 110 to activate and configure network devices (such as devices 120A or 120B) and provision the ordered telecommunication service. All of the aforementioned components may be in communication via a network 150. The network 150 may comprise a telecommunications network or IP and/or data network managed by a service provider. The network 150 allows the various components of the system 100 to communicate with one another. A user interface 206 of the system 100 may be implemented to access one or more of the above systems.

Figure 2:
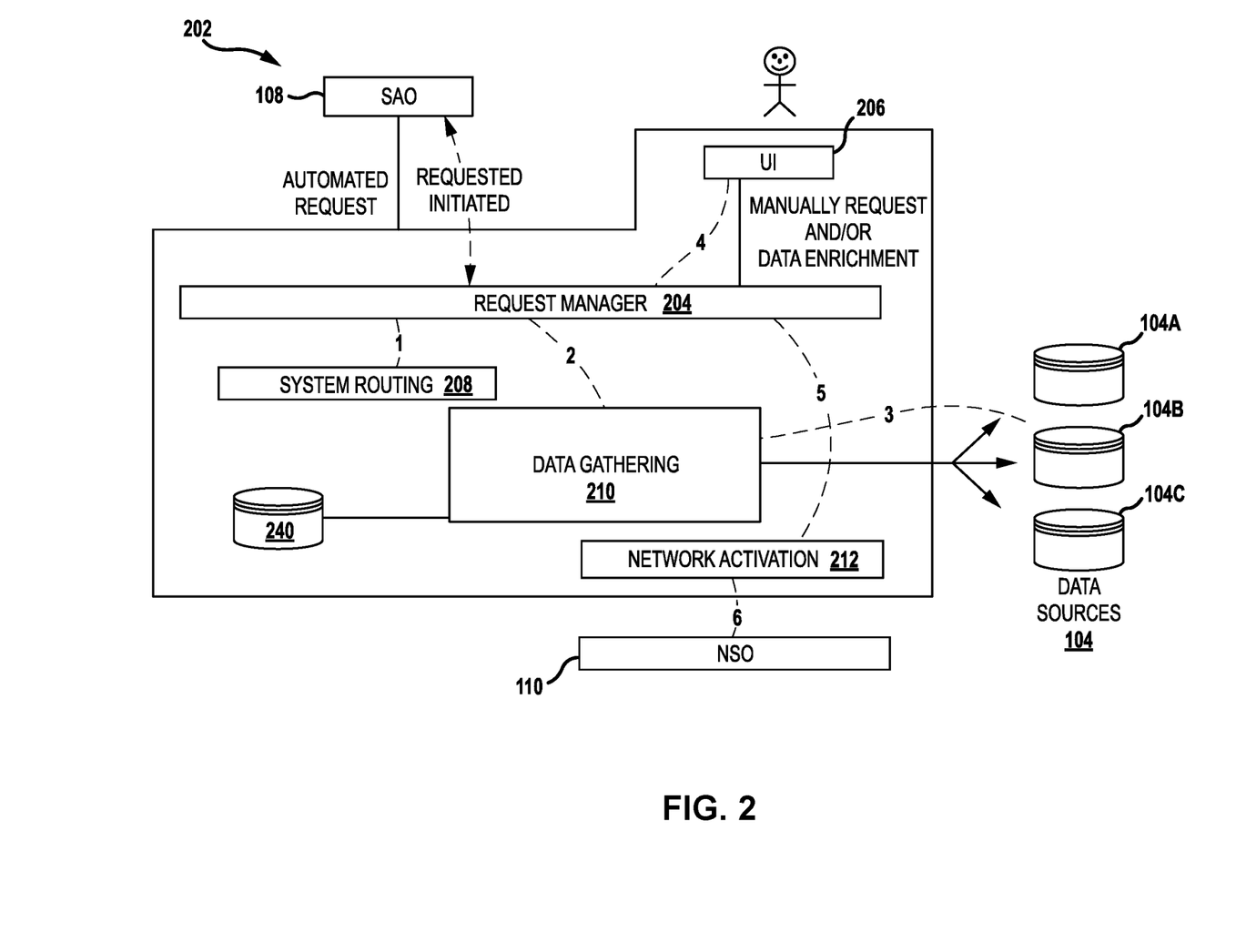
FIG. 2 illustrates an exemplary view of a portion of the order provisioning system of FIG. 1 focusing on exemplary components of the ACT system, according to aspects of the present disclosure.

The operation of the ACT system 200 of FIG. 1 is now described in greater detail with reference to the method 400 of FIG. 4 and the system illustrated in FIG. 2. In block 402 of FIG. 4, the ACT system 200 receives or otherwise accesses a request from the SAO system 108. In one embodiment, the ACT system 200, which may be embodied using one or more computing devices and processors, may comprise dedicated engines, applications, or hardware/software modules to access a request from the SAO system 108 and provide other features described herein. Specifically, the ACT system 200 may comprise a request manager 204 which may retrieve or access such a request from the SAO system 108 as shown in FIG. 2 which illustrates a portion 202 of the system 100 focusing on exemplary features of the ACT system 200. As shown, the request may be automated or otherwise automatically sent from the SAO system 108 to the request manager 204 of the ACT system 200 as the request is generated for a network connection design.

As discussed herein, the request is generated by the SAO system 108 to configure one or more network devices to provide network services in response to a service request. In particular, the request from the SAO system 108 includes information and data of a network connection design to provide the services. The network connection design is built or created by the SAO system 108 in response to receiving an order for a telecommunications service from the order entry systems 106. More specifically, a customer computing device 122A, customer, network administrator, etc. may transmit an order for a telecommunications service, such as an order for a virtual private network (VPN) or some form of Internet service to a customer's devices or network, to the order entry systems 106. The order entry systems of 106 of FIG. 1 may comprise different order entry applications or systems used by the system 100 to retrieve or access orders for telecommunications services and pass information about the orders to the SAO system 108 and the ACT system 200. In one embodiment, the order entry systems 106 (or the SAO system 108) may extract order parameters from an order received from a customer device or otherwise identify order parameters.

An order parameter may include a desired network connection or service, an identification of a customer network device, a customer identification number, and the like. Each of the order entry systems 106, such as the order entry system 106A and order entry system 106B, may be associated with different systems/customers and may receive orders from customers with different types of data or formats. For example, the order entry system 106A may be configured to receive orders associated with VPNs; whereas the order entry system 106B may be configured to receive orders to connect customer devices to Internet access services. As such, the order entry system 106A may generate orders which involve information about a first device type while the order entry system 106B may involve information about a second device type. In addition, it should be understood that an order may include a request for multiple different kinds of telecommunications services or an order may generate multiple requests (requiring different network elements to be configured to provide a customer with the telecommunications services).

Figure 3:
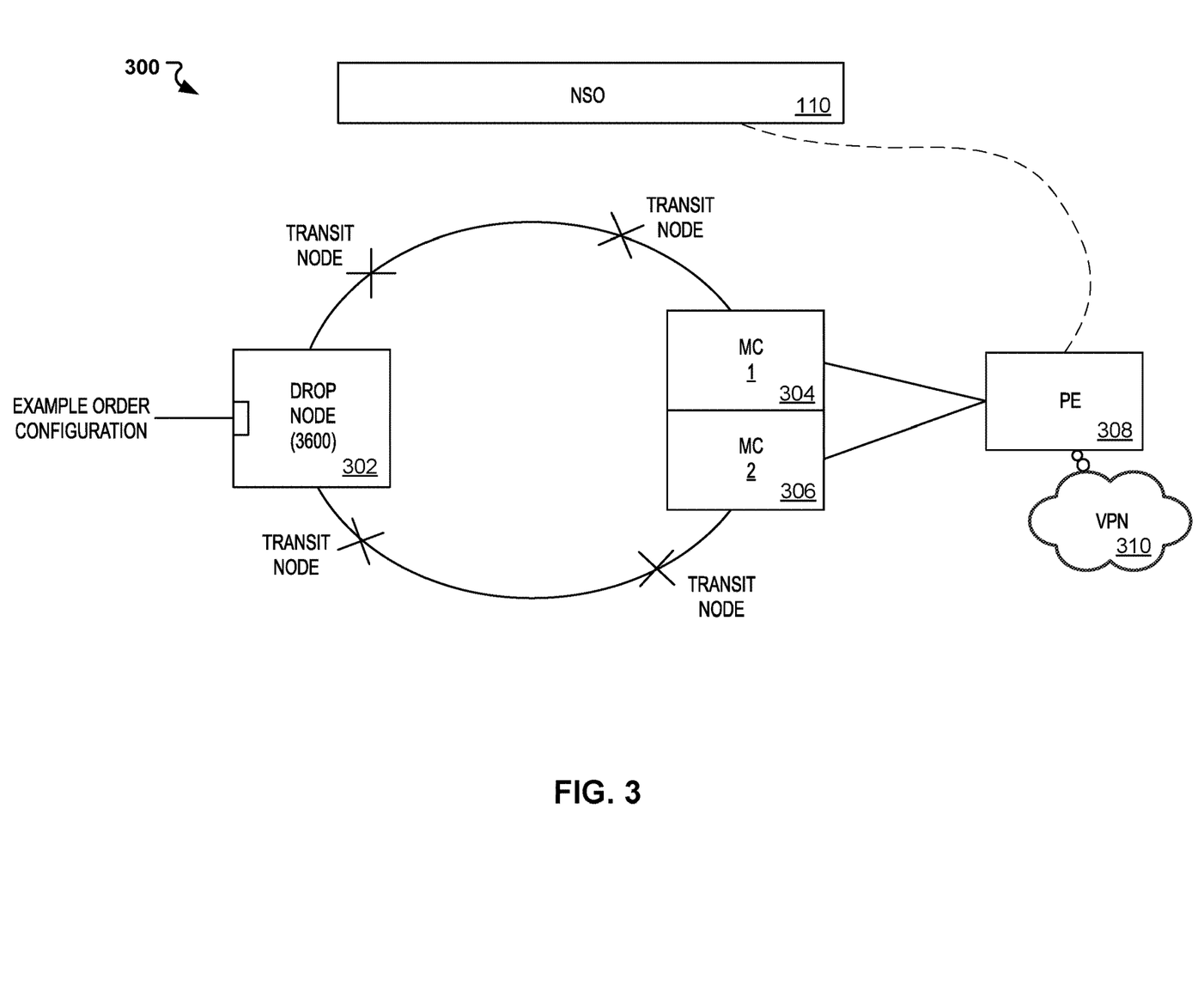
FIG. 3 is an exemplary illustration of a device configuration, according to aspects of the present disclosure.

Once the order is received by the order entry systems 106, the order may then be routed to or otherwise accessed by the SAO system 108, which analyzes the order parameters, and creates a network connection design to provide the telecommunications service for the customer network environment associated with the customer computing device 122A. An illustration of an exemplary network connection design 300 is shown in FIG. 3. Through the execution of the exemplary network connection design 300, a provider edge (PE) device 308 of a telecommunications network may be activated, configured, and/or connected within the network to provision a telecommunications service for a customer of the network, such as a VPN 310. For example, the network connection design 300 defines a network connection path comprising a drop node 302, a metro core (MC) 1 device 304, a MC 2 device 306, and the PE device 308. The MC 1 device 304 and the MC 2 device 306 may comprise network elements of a service provider such as network switches of a telecommunications core network. To provide the requested service to a customer, the components of the network may be configured or commissioned by implementing the network connection design 300. After provisioning, a customer network device may be connect to or otherwise communicated with the drop node 302, one or more transit nodes such as the MC devices 304 and 306, and ultimately connected to the PE device to obtain access to a telecommunications service such as the VPN 310.

Figure 5:
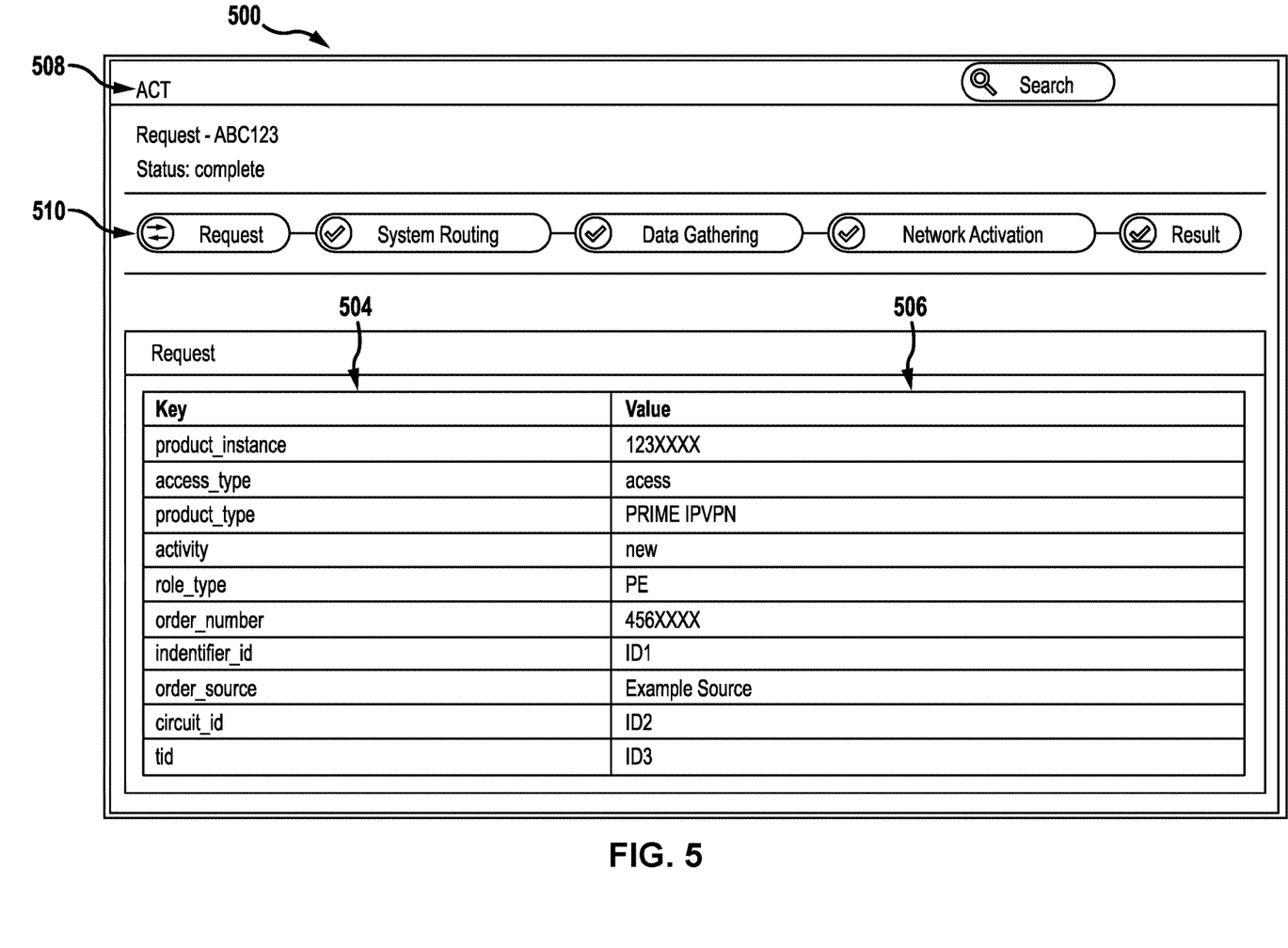
FIG. 5 is an exemplary screenshot of an interface displaying order attributes included in a request for services, according to aspects of the present disclosure.

In addition to creating a network connection design for the ordered telecommunications service, the SAO system 108 generates a request, such as the request 502 illustrated in FIG. 5. The request, associated with the network connection design, may include data used to activate and configure network devices, and also instruct that the devices actually be activated and configured to implement the network connection design and provision the ordered telecommunications service. For example, referencing the network connection design 300 of FIG. 3, the request may be used to generate instructions to activate and configure the MC 1 device 304, the MC 2 device 306, and the PE device 308 in a manner defined by the network connection design 300. The SAO system 108 may utilize network design engineers, network design automation applications, and/or combinations thereof to generate the network connection design and the request.

In one embodiment, the request may include a plurality of keys, fields, or parameters, such as network device identifiers and service identifiers which may be associated with specific values. The keys assist with determining what data sources the ACT system 200 needs to access in order to activate and configure devices for the network connection design. Any one key of the request may assist with identifying a specific data source or storage repository that stores or has access to some information needed for the network connection design. In addition, the system 100 may be designed such that ACT system 200 uses the values of the keys to retrieve data from the specific data sources 104 and activate and configure devices of a network connection design associated with the request. As shown in FIG. 5, a request may include a variety of keys 504, including but not limited to, a produce instance, an access type, a product type, an activity, a role type, an order number, an identifier, an order source, a circuit identifier, and the like. In general, however, any data set, information, or value associated with a network design may be a key utilized by the ACT system 200. Values 506 associated with the keys 504 may comprise a string or set of characters or other units of information which may be used by the ACT system 200 to locate one or more specific storage devices or data source 104 that have information that is needed for a specific request. For example, in the request 502 of FIG. 5, a value 506 associated with the circuit_ID key, ID2, may define a particular network device (or network device type) that needs to be activated and configured according to the network connection design. Information about that network device type may be stored in a specific data source 104 associated with the value of ID2 and accessed by the ACT system 200 using the value of ID2.

In some embodiments, aspects of the request may be defined or created using the order parameters. For example, where a customer submits an order for a telecommunications service, the order may include a customer ID, which the SAO system 108 may then use, during creation of the network connection design, to query a database and retrieve information about the customer network environment, including the types of network devices the customer is using or has access to. Such information may be especially useful when the SAO system 108 is generating the network connection design and the request as the customer's network or account may limit the customer to only connecting to certain network devices of the service provider.

Returning to FIG. 4, and in particular block 404, the request manager module 204 of the ACT system 200 may pass the request and associated information to a system routing module 208 of the ACT system 200 (illustrated in FIG. 2 as step 1) which may in turn route the request to a data gathering module 210 of the ACT system 200 (illustrated in FIG. 2 as step 2). Using one or more of the keys or values associated with the keys, the data gathering module 210 communicates with particular data sources 104 associated with ACT system, such as data sources 104A or 104B. Stated another way, the ACT system 200 may use values of the keys to select and access specific data sources 104 and the data stored within the data sources to access the data useful for building out the specific network connection design associated with the request. Returning to the previous example, the value of the circuit_ID key, ID2, may be associated with a specific data source 104A. In other words, a data source 104A may be an inventory database that stores data about the device having the circuit ID of "ID2" and, when the ACT system is presented with the request 502, the ACT system 200 can retrieve configuration and activation data from the data source 104A as needed to activate and/or configure a device with the circuit ID of ID2 utilizing the key values contained within the request 502.

In block 406, once the request is directed to the appropriate data source 104 associated with the key, a data gathering module 210 (of FIG. 2) of the ACT system 200 queries data from the data source/s 104 (illustrated in FIG. 2 as step 3) associated with the key to compile any activation and configuration data needed for the request. It should be understood that the request accessed by the ACT system 200 may be associated with a network connection design to connect a customer network device with multiple, different devices such as network device 120A and network device 120B. The device 120A may be different from the device 120B, or otherwise comprise a different type of network device (with different configuration commands, communications protocols, and the like for configuring the device to provision a service). In such an example, the request may contain or otherwise be associated with two or more circuit ID or device ID keys; a first key for the device 120A, and a second key for the device 120B. The ACT system 200 uses the first key to locate a particular data source 104A that has access to configuration information for the device 120A and uses the second key to locate another data source 104B that has access to configuration information for the device 120B.

Figure 4:
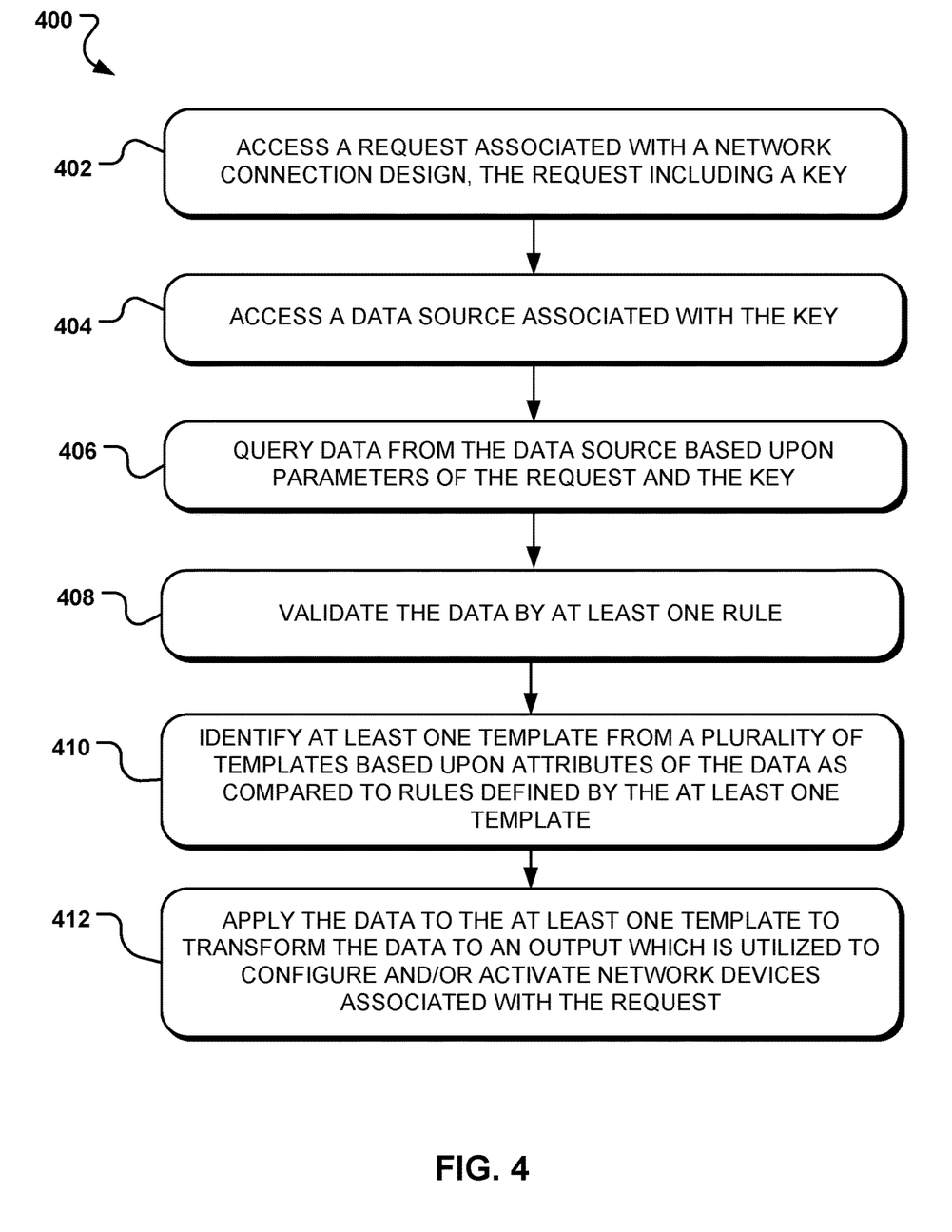
FIG. 4 is an exemplary process for building and implementing the ACT system, according to aspects of the present disclosure.

In block 408 of FIG. 4, the data extracted from the data sources 104, and the values of the request may be validated or pre-checked by the ACT system 200 using a plurality of predetermined rules, including field-based rules and scripts. Using the predetermined rules and/or scripts, the ACT system 200 identifies possible problems with the data or the values of the request and may initiate a prompt to the customer computing device 122A or a device of the SAO system 108 to correct certain problems (illustrated in FIG. 2 as step 4). For example, the request may be accessed by the ACT system 200 with missing, incomplete, or inaccurate order values for certain keys. An entire value associated with a key may be omitted or may include data that is incomplete. Using the ACT system 200, one or more scripts and/or rules may be utilized to identify when certain fields of information (key values) are missing by looping through a request to identify omitted or incorrect data. Rules may, for example, require that certain key values be populated with certain types of information such as numerals or certain combinations of strings of alphanumeric values.

When missing or invalid data is detected, the request manager 204 may submit order/request information to a user interface (UI) 206 as a prompt to a user where the user (customer or service provider technician) may manually make corrections or additions to the data or the request. In some embodiments, the ACT system 200 utilizes machine learning and identifies patterns with invalid data of orders processed by the ACT system 200 such that ACT system 200 can anticipate potential common errors with requests and prompt a user with specific suggestions to correct invalid data. For example, where the ACT system 200 accesses a request and a value for a key is provided in the request that identifies a customer device that is not recognizable by the ACT system 200 or is otherwise incorrect, the ACT system 200 may submit a prompt to the UI 206 (or the customer computing device 122A) that displays, "did you mean the device 9000?"

Once corrected/additional data is returned to the ACT system 200 from the UI 206, the data may again be validated by the ACT system 200 using the plurality of predetermined rules and scripts as described above. In some embodiments, where the request defines a connection to devices of the service provider and such devices or networks of the service provider are unavailable, the ACT system 200 may cancel the request/order and submit an alert to the UI 206 or to the customer computing device 122A indicating that the order cannot be processed. As another benefit of the ACT system 200, all of the data retrieved from the order entry systems 106 may be applied to and flow through the same rules reducing the conventional steps that may involve manual intervention or multiple separate procedures to validate data from different orders or different order entry systems. In other words, the ACT system 200, as shown in FIG. 1, may be connected within a network of a telecommunications service provider between multiple order entry systems or requestor modules and a configuration system, such as the NSO system 110 (or a set of configuration systems). In this manner, the ACT system 200 is situated to aggregate orders from different order entry systems and access activation and configuration data needed to prepare devices to provide a telecommunications service using a single tool (the ACT system 200).

In block 410 of FIG. 4, at least one digital template is identified or selected by the ACT system 200 by comparing the validated data with fields and other information defined within each of a plurality of templates. In one embodiment, the templates may be pre-defined templates, implemented in e.g. JSON or XML that, when utilized, convert the validated data accessed from the data sources 104 to an output in a format, protocol, or command set that can be used to implement activation and configuration of devices for the request. In other words, a computing device or processor associated with the ACT system 200 may utilize a storage device 240 (of FIG. 2) or database containing the plurality of templates and compare the validated data with information about the plurality of templates. As a result, one or more activation templates may be identified or chosen when the validated data meets predetermined conditions defined by the templates and/or the ACT system 200. If the provided data satisfies one or more predetermined conditions for a given template, that given template may be chosen or identified to apply the validated data into the given template and produce an output (as shown in block 412). The predetermined conditions of the templates may include one or more software conditions, conditional expressions, conditional constructs, or conditional statements such as WHEN clauses, IF-THEN statements, IF-THEN-ELSE statements, case and switch statements, pattern matching, has-based conditional statements, or the like in conjunction with other rules/identifiers to identify when certain templates are needed for certain validated data sets.

In general, the verified data satisfies a given template when the data meets the conditions laid out in the template. For example, a particular template may be utilized to configure a telecommunication switch of the network. Through the data obtained from the request and/or obtained from the one or more data sources 104, the ACT system 200 may identify a particular template of instructions to activate or configure the switch device. In other words, the request includes keys that describe the switch and a type of configuration of the switch executed as part of the service design. With this information, a template to configure the switch for the particular service is identified and obtained from the database 240. In this manner, the provided or obtained information is utilized to select a configuration template for use in creating one or more instructions to configure a networking device. Further still, the information provided in the request or obtained from the data sources 104 may be used by the ACT system 200 to populate portions of the template to create the configuration instructions.

In one example, a request for a network service may be accessed by the ACT system 200. The request includes a key that the ACT system 200 utilizes to locate and extract data from one or more specific data sources 104 associated with the key. The data sources 104 associated with the key provide the data that is specifically used to configure devices and provision a service as defined by the request. Once the data is validated, the data may be fed through or otherwise applied to a plurality of templates to determine if the validated data meets conditional expressions of one or more of the templates. If the validated data meets conditional expressions of a template, the template may be identified and/or selected. Each of the templates may be designed for certain data attributes, and consequently designed to generate outputs to configure certain devices and provision certain network services.

Returning to FIG. 4, in block 412, once one or more templates have been selected or otherwise identified, the validated data may be processed or otherwise applied to the selected templates to transform the data and generate an output or a set of output values. For example, the validated data may be applied to a first template to produce an output specific to the first template. In one embodiment, the data collected from the data sources 104 comprises the attributes needed for comparing the validated data with the templates, certain templates are selected based upon the attributes of the data that meet certain conditions of one or more templates, and the data is applied to the selected templates to produce at least one output. In one embodiment, the templates comprise blocks of software code with predefined fields. Attributes of the validated data may populate or pass through the predefined fields as, e.g., an ACT system application 912 compares attributes of the validated data with fields of the templates.

Figure 8:
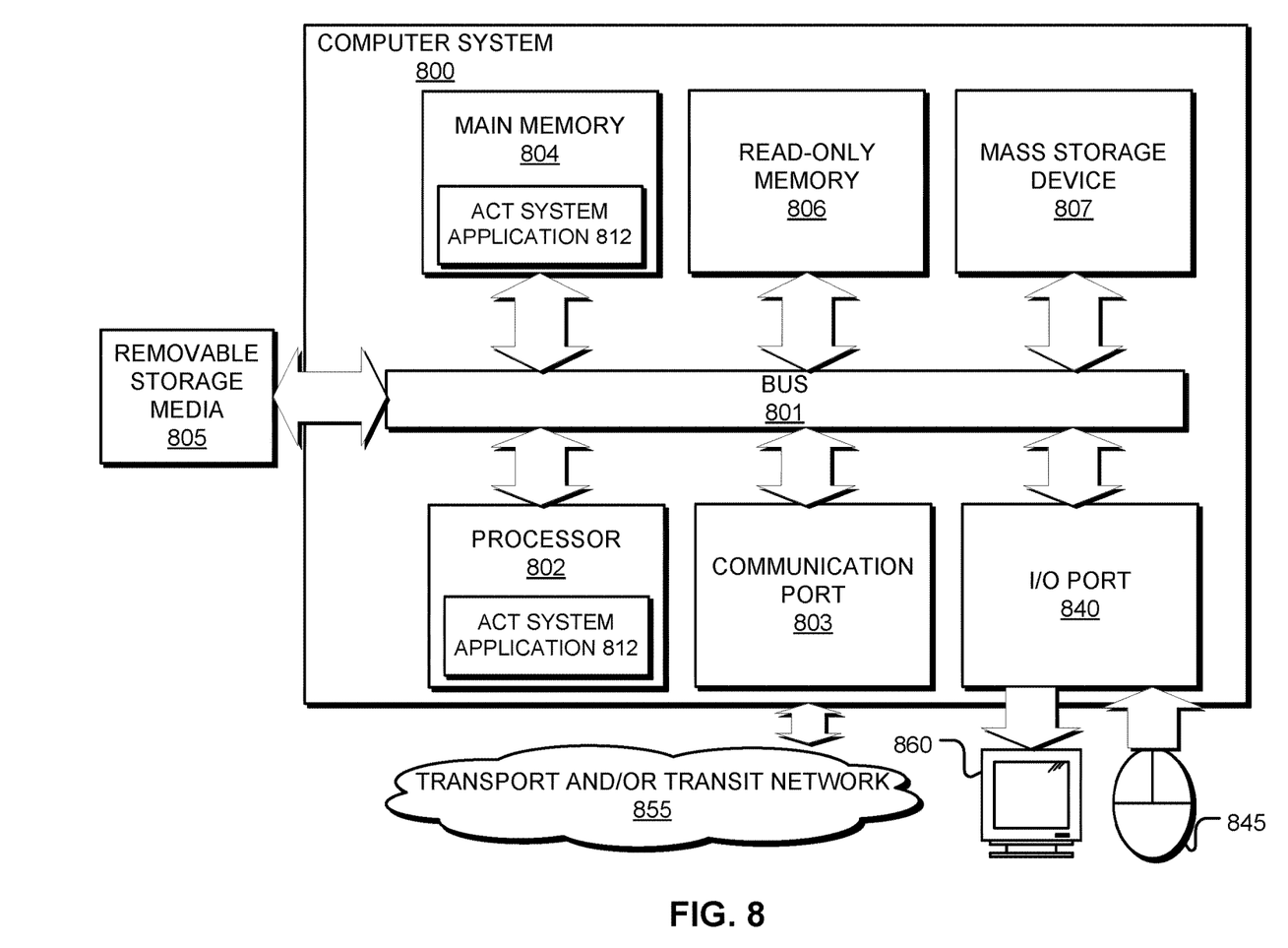
FIG. 8 illustrates an example of a computing system that may implement various services, systems, and methods discussed herein.

The templates may be stored in one or more storage devices such as the storage device 907 of FIG. 8. Further, the logic and processes for comparing and applying the data extracted from the data sources 104 to the templates may be developed as part of a templating application or engine executed by the ACT system 200 using the processor 802. In one embodiment, a template as discussed herein may comprise a digital extensible markup language (XML) template. XML is a markup language defining a set of rules for encoding documents. In some embodiments, the template may comprise an Extensible Stylesheet Language (XSL) style sheet defining or more rules to apply when data is matched with the template. The templates may utilize a partial YANG model to generate the output of block 412 in order to specially format the output for a configuration system such as the NSO system 110 or other configuration engine/system. A template as described may be a multi-part document and may include dot notation, objects, and other values that define attributes of an XML sheet. The template may further comprise a string of characters, including markup, content, elements, attributes, tags, declarations, and may utilize one or more XML parsers. The ACT system 200 may utilize the processor 802 to analyze the content of data retrieved from the data sources 104, and apply the content to one or more templates.

An output as created by the application of the verified data to the templates may include data formatted into a particular model, language, format, communication protocol, or the like that may correspond to a particular device or device type that is to configure or provision components of a telecommunications network to provide a service. For example the NSO system 110 of FIGS. 1 and 2 may be a configuration module responsible for communicating with a particular Router R and a certain template may be used to produce an output that is specifically formatted to facilitate communication with and configure the Router R to provide a telecommunications service. In some embodiments, the output comprises specific software and/or machine languages depending upon the device or device type that needs to be configured or otherwise modified in some form to provision a telecommunications service. In short, templates convert or transform the validated data into whatever format is needed to communicate with and configure devices needed to provision a service.

As discussed, the system generates an output resulting from a template that the NSO may utilize to activate, configure, or otherwise prepare devices in order to provision services for a customer of a telecommunications network. In particular, data extracted or otherwise accessed from one or more of the data sources 104 may be fed or applied to a template as data attributes to generate an output. The ACT 200, through the use of the template, generates the output. The output, in general, includes a plurality of instructions that a provisioning system (such as the NSO system 110 of FIG. 1) may execute to provision or configure a device of the telecommunications network. In other words, the output provides the information and instructions the NSO system 110 utilizes to configure or provision a network device as part of providing the service to the requesting customer. In other embodiments, the ACT system 200 itself may communication with the device to configure or provision the device. In this case, the output from the ACT system (utilizing the information and the templates) provides the instructions for configuring the device which are executed by the ACT to provision the device for the requested service.

The ACT system 200 may utilize numerous templates and, in some embodiments, validated data may be cycled through all of the templates at least once to determine whether a particular template (or multiple templates) should be used to produce an output/s. In some embodiments, a single request may trigger the use of a particular set of templates. For example, a given request may cause the ACT system 200 to identify and apply 15 templates to validated data which may respectively generate 15 different outputs (to be used to configure and activate one or more network devices to provide a service by the NSO system 110). One or more pre and post check scripts may be applied to the templates and the data as it is being compared to the templates to determine whether network elements associated with the request are available for use. For example, the pre and post check scripts may determine whether a port or interface of a network device defined by the request (and associated with the data extracted from the data sources 104) is available. If an error is identified by the scripts, a prompt may be displayed to modify or cancel the order by way of the UI 206 or the customer computing device 122A. Further, the output itself may be applied to one or more rules to make sure the network is in an available state to run the output and configurations associated with the output.

The output generated in block 412 of FIG. 4 may be used to activate, configure, and otherwise prepare one or more network devices to provide a telecommunications service as intended by the network connection design which prompted the request. The request manager 204 of the ACT system 200 may transmit the output to a network activation module 212, which may then transmit the output to the NSO system 110. In some embodiments, the NSO system 110 may then apply configurations (defined by the output) or otherwise communicate with devices such as the PE device 308 of FIG. 3 to setup the device to provide a telecommunications service to a customer network device.

In sum, the ACT system 200 facilitates the data extraction and transformation required to complete device configurations, from any number of systems, which provides broad applicability and utility for the ACT system 200. The ACT system 200 takes input from multiple sources, conducts data collection from appropriate subsystems/data sources, applies a plurality of rules to validate the data, and applies the validated data to a templating engine that builds a particular configuration output for the network to provision a telecommunications service.

As further illustrated in FIG. 1, in some embodiments, the ACT system 200 may be a centralized portion of the system 100 and be connected between the SAO system 108, the order entry systems 106, and the NSO system 110. As such, the ACT system 200 facilitates communication between various components of the system 100. The SAO system 108 may be configured for order and network design decomposition and may control the sequence and timing of events in the system 100. The SAO system 108 may further be configured for order due date management, exception management, and order changes. The NSO system 110 illustrates an exemplary configuration or activation system which may be implemented to apply configurations, activate devices, and communicate with network elements to provision services in the order provisioning system 100. For example, the NSO system 110 may be configured to utilize output data received from the ACT system 200 in order to communicate with one or more devices 120 of the service provider and configure or otherwise prepare the devices 120 to provision a telecommunications service. The NSO system 110 may be one type of configuration system utilized by the system 100. While a single NSO system 110 or output system is shown in the exemplary illustration, the system 100 may comprise a plurality of different configuration systems which may be used to provision services and configure different types of network elements and/or devices of the service provider.

In one alternate embodiment, the ACT system 200 is operable to communicate with and configure devices of a network connection design directly (using the output generated as described herein), instead of utilizing the NSO system 110. The data sources 104 of FIG. 1 illustrate exemplary data storage devices, memory, or other such repositories storing or otherwise having access to data specific to various order configurations, device types, or certain sub-networks or network clusters of the service provider. The data stored within the data sources 104 may be used to complete an order by supplementing the order/request with data needed to configure a device 120 in order to provision a service for a customer. In one embodiment, the ACT system 200 communicates directly with the data sources 104 in the course of consolidating and enhancing data for a given order as described herein. In alternate embodiments, the data from the data sources 104 may be aggregated or federated within a centralized database such that the ACT system 200 communicates with a single data source 104 to retrieve data for a request.

Figure 6:
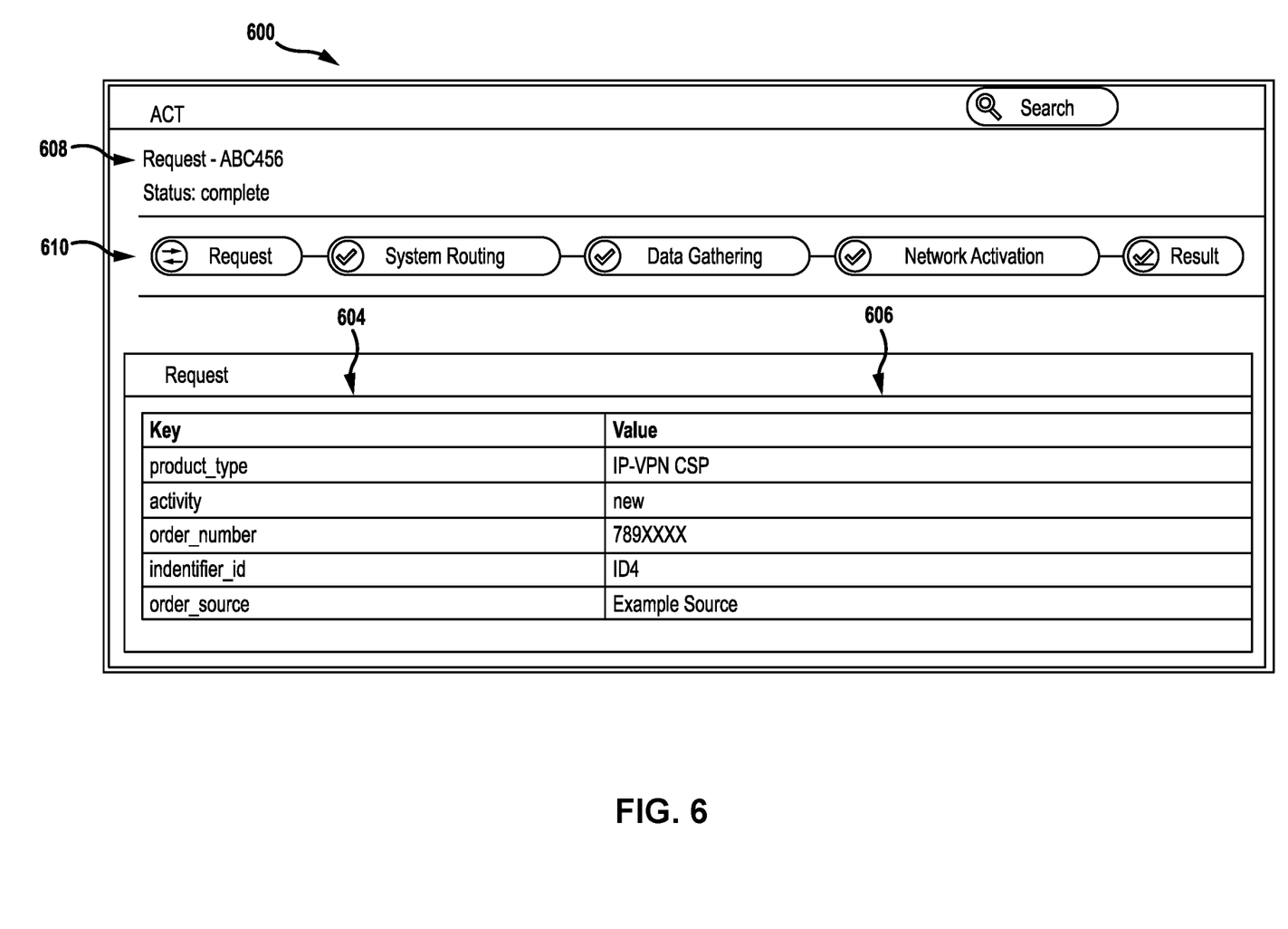
FIG. 6 is another exemplary screenshot of the interface of FIG. 5, according to aspects of the present disclosure.
Figure 7:
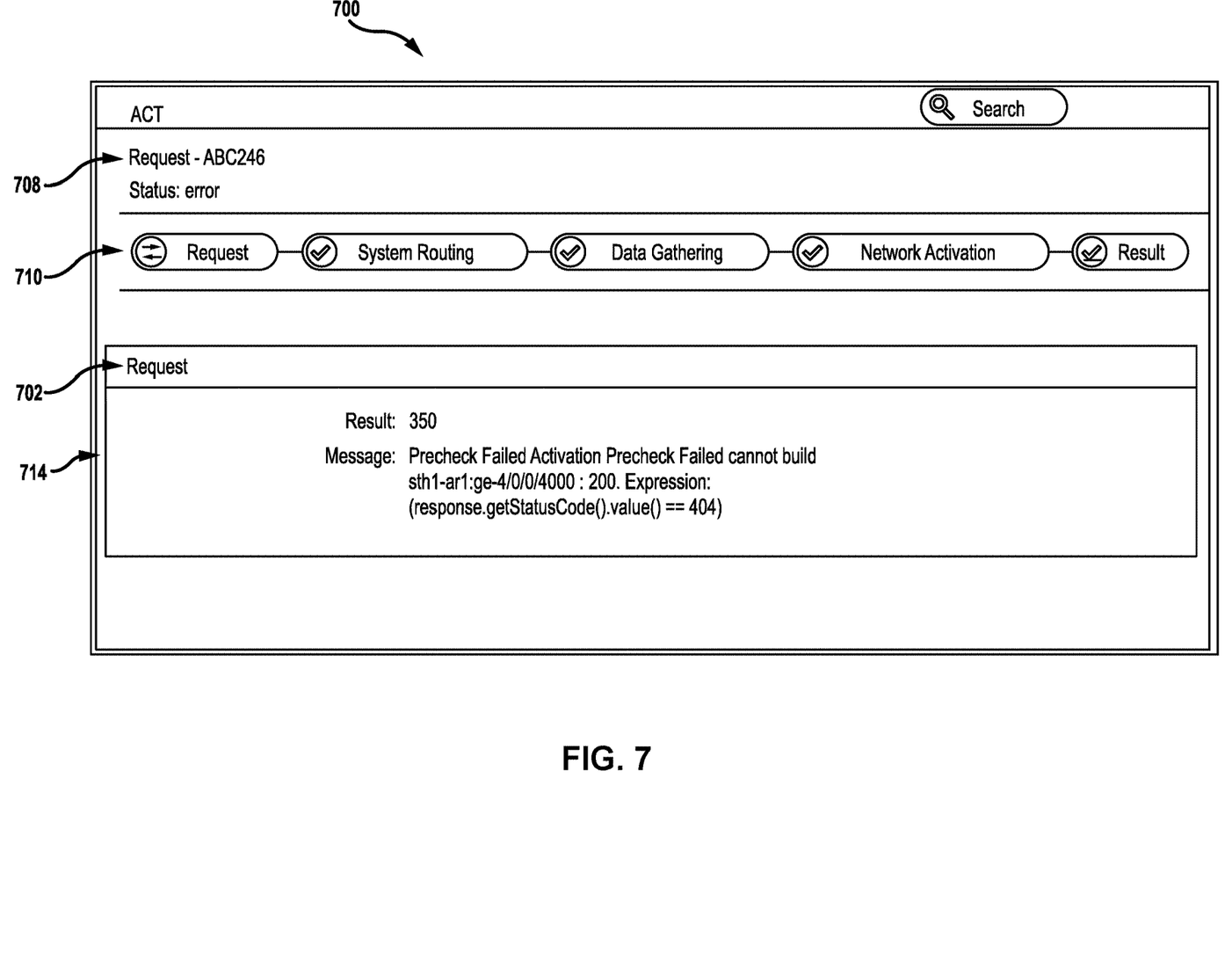
FIG. 7 is an exemplary screenshot of the interface showing an error message, according to aspects of the present disclosure.

FIGS. 5-7 illustrate various screenshots of an application associated with the ACT system 200. The screenshots depict initial order requests received at the ACT system 200, failed configurations, and successful configurations which may be viewable via the user interface 206 or the customer computing device 122A. The screenshots are merely exemplary and are not intended to be limiting with respect to the user interface 206 or any interface described herein. For example, FIG. 5 is an interface for a customer or network administrator to interact with the ACT system. In the screenshot 500 illustrated, a request received at the ACT system 200 is shown, including a plurality of keys 504 and a corresponding key value 506. The keys 504 relate or describe aspects of a network design to provide a requested service to a customer of the telecommunications network. For example, the request includes a key "product_type" that describes the type of service to be provided, an IP VPN service in the example shown. Other keys 504 include a circuit ID, an order number, network device identification, and the like. Similarly, FIG. 6 shows an interface 600 for a customer or administrator of the ACT system 200 of a second example of a request, including different keys and key values.

Any one or more of the keys shown in the screenshots of FIG. 5 and FIG. 6 may be utilized by the ACT system 200 to access specific data from a particular data source 104 in order to configure devices needed to fulfill an order for a telecommunications service. As further shown, the interfaces may include status indicators 510 and 610 with checkboxes to indicate that certain steps associated with the setup and preparation of devices to provide a telecommunications service (system routing, data gathering, and network activation) have been achieved. For example, status indicators 510,610 may reflect that a request for telecommunications services has been received, the request has been routed to an appropriate data source, the data gathering/extraction has successfully occurred, and network activation successfully completed. Network activation may comprise utilizing the data to generate an output from the plurality of templates as described here, and utilizing the output to communicate with, configure, and activate devices and services as requested. FIGS. 5 and 6 indicate that a request for network services is complete. As shown, the interfaces 500 and 600 of FIGS. 5 and 6 may further include request IDs 508 and 608.

FIG. 7 illustrates an interface 700 of a request 702 similar to the interfaces of FIGS. 5-7 with a request ID 708, and a request status indicator 710. FIG. 7 further shows an exemplary error message 714 that may be displayed to a customer or administrator of the ACT system 200. Specifically, the depicted error message 714 may be displayed when the ACT system 200 and/or the NSO system 110 is unable to configure devices to provide a telecommunications service when the precheck of the received information cannot be verified. The error message 714 indicated is but one of any possible error message that may be provided to the user or administrator during operation of the ACT system 200.

FIG. 8 is an example schematic diagram of a computing system 800 that may implement various methodologies discussed herein. For example, the computing system 800 may comprise a server or other such computing device used to execute or otherwise implement the ACT system 200. In the example of FIG. 8, the ACT system 200 is represented as at least one ACT system application 812 used by a service provider to validate orders from customers, validate data from the orders, and format the data to configure devices and provision telecommunications services. The computing system 800 includes a bus 801 (i.e., interconnect), at least one processor 802 or other computing element, at least one communication port 803, a main memory 804, a removable storage media 805, a read-only memory 806, and a mass storage device 807. Processor(s) 802 can be any known processor, such as, but not limited to, an Intel® Itanium® or Itanium 2® processor(s), AMD® Opteron® or Athlon MP® processor(s), or Motorola® lines of processors. Communication port 803 can be any of an RS-232 port for use with a modem based dial-up connection, a 10/100 Ethernet port, a Gigabit port using copper or fiber, or a USB port. Communication port(s) 803 may be chosen depending on a network such as a Local Area Network (LAN), a Wide Area Network (WAN), or any network to which the computer system 800 connects. Computing system 800 may further include a transport and/or transit network 855, a display screen 860, an I/O port 840, and an input device 845 such as a mouse or keyboard.

Main memory 804 can be Random Access Memory (RAM) or any other dynamic storage device(s) commonly known in the art. Read-only memory 806 can be any static storage device(s) such as Programmable Read-Only Memory (PROM) chips for storing static information such as instructions for processor 802. Mass storage device 807 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 801 communicatively couples processor(s) 802 with the other memory, storage, and communications blocks. Bus 801 can be a PCI/PCI-X, SCSI, or Universal Serial Bus (USB) based system bus (or other) depending on the storage devices used. Removable storage media 805 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 804 is encoded with at least one ACT system application 812 that supports functionality of the ACT system components discussed above. The ACT system application 812 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 802 accesses main memory 804 via the use of bus 801 in order to launch, run, execute, interpret, or otherwise perform processes, such as through logic instructions, executing on the processor 802 and based on the ACT system application 812 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments as described herein may include or comprise one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for provisioning a network service, comprising:
utilizing a processor in communication with a non-transitory memory for storing instructions that are executed by the processor to perform operations of:
accessing a request associated with a network connection design, the request including a key and an associated key value, wherein the associated key value identifies a network device associated with the network connection design and a device type;
querying data associated with providing a telecommunications service based on the request from a data source based at least on the associated key value and the device type;
validating the data using a rule comparing the data to an expected data structure;
identifying a configuration template from a plurality of templates based upon attributes of the data; and
applying the data to the configuration template to transform the data to an output, the output comprising instructions to a network configuration system to configure the network device associated with the network connection design.

2. The method of claim 1, further comprising:
configuring the network device using the output, the output comprising a configuration command specific for configuring the device to provide a particular telecommunications service using the device, the configuration command of a communication format unique to the device;
wherein the network connection design is created to implement the particular telecommunications service;
wherein the associated key value of the key is used to locate the data source; and
wherein the rule requires that predetermined fields of the request be populated, the fields of the request be of a unique format, and the device be available for configuration in order to provision the particular telecommunications service.

3. The method of claim 1, further comprising:
searching through the plurality of templates; and
identifying the configuration template from the plurality of templates based where attributes of the data satisfy a WHEN clause of the configuration template.

4. The method of claim 1, further comprising applying a script to the data before or after applying the data to the configuration template to ascertain whether the network device associated with the network connection design is available for use.

5. The method of claim 1, wherein the step of validating the data using the rule comprises:
determining whether the data is incomplete or should be revised based on the comparison of the data to the expected data structure;
transmitting a prompt to update the data when the data is incomplete or should be revised; and
receiving updated data through a user interface.

6. The method of claim 5, further comprising accessing a new request to configure the devices, the new request replacing the request.

7. The method of claim 5, further comprising:
tracking changes to the data based upon content received from the updated data; and
analyzing the changes for use with future requests to provision network services.

8. The method of claim 1, wherein the output comprises a first predetermined language format specific for communicating with and configuring the network device according to the network connection design.

9. The method of claim 8, further comprising applying the data to an additional configuration template to generate an additional output, wherein the additional output comprises a second predetermined language format specific for configuring an additional network device associated with the network connection design.

10. A system for provisioning a network service, comprising:
at least one communication port for receiving a request associated with a network connection design to provide an intended network service to a user of a telecommunications network, the request comprising a key and an associated key value, wherein the associated key value identifies a network device and a device type;
a processing device; and
a computer-readable medium connected to the processing device configured to store instructions that, when executed by the processing device, performs the operations of:
querying data associated with the intended network service from a data source based at least on the associated key value and the device type of the request; and
transforming the data to an output to configure the network device to provide a telecommunications service by identifying a configuration template from a plurality of templates based upon attributes of the data applying the data to the configuration template to transform the data to the output.

11. The system of claim 10, wherein the processing device further performs the operation of transforming the data using the configuration template, wherein the configuration template is one of a plurality of templates stored within a database, each of the plurality of templates associated with specific network devices.

12. The system of claim 10, wherein the processing device further performs the operation of selecting the data source to access the data using the associated key value, the associated key value associated with the data source and the network device.

13. The system of claim 10, wherein the output comprises instructions for a configuration system to communicate with and configure the network device as requested by a customer and specified in the request.

14. The system of claim 13 wherein the request is associated with an order for the telecommunications service; and
wherein the processing device is connected between an order entry system and the configuration system such that the processing device validates information associated with the request before the request is sent to the configuration system.

15. The system of claim 10, wherein the key of the request is one of a produce instance value, an access type value, a product type value associated with a desired telecommunications service, an activity value, a role type value, an order number, an identifier, an order source value, and a circuit identifier.

16. An apparatus, comprising:
a first network device;
a second network device; and
a computing device for communicably coupling the first network device with the first network device in response to a request, the request comprising a key, wherein the key identifies the first network device and a device type;

wherein the computing device utilizes the key and the device type to access data and a template associated with the key and the computing device applies the data to the template to generate an output, the output comprising information for configuring the second network device to be coupled to the first network device to provision a telecommunications service.

17. The apparatus of claim 16, further comprising:
wherein the first network device comprises a network interface device associated with a customer;
wherein the second network device comprises a network element of a telecommunications network; and
wherein the computing device is connected in the telecommunications network between an order entry system and a configuration system such that the computing device analyzes the request that ingresses to the telecommunications network from the order entry system before the request is transmitted to the configuration system.

18. The apparatus of claim 16, wherein the computing device validates the data by applying at least one rule to the data to determine whether the data is incomplete or contains an error.

19. The apparatus of claim 16, wherein the template comprises a multi-part digital document including at least one WHEN clause, the at least one WHEN clause associated specifically with that second network device.

20. The apparatus of claim 19, wherein the WHEN clause of the template is met when the computing device feeds the data through a template repository containing the template.

* * * * *